United States Patent Office 3,517,059
Patented June 23, 1970

3,517,059
PREPARATION OF METHACRYLIC ACID
Theodor Volker, Fribourg, Switzerland, and Erika Schindelmann, born Pichler, Dachau, near Munich, Germany, assignors to Lonza Ltd., Gampel, Valais, Basel, Switzerland
No Drawing. Filed Oct. 24, 1966, Ser. No. 588,730
Claims priority, application Switzerland, Nov. 25, 1965, 16,243/65
Int. Cl. C07c *51/32, 51/28*
U.S. Cl. 260—533         7 Claims

ABSTRACT OF THE DISCLOSURE

Methacrylic acid can be continuously prepared from the reaction mixture obtained by the oxidation of isobutylene with dinitrogen tetroxide in the presence of nitric acid by removing free nitric acid from said reaction mixture, heating the residue dissolved in acetic acid in a polar organic reacting medium, whose boiling point is above 160° C. to a temperature of at least 160° C. and continuously removing the methacrylic acid being formed therein.

---

This invention relates to the preparation of methacrylic acid from α-hydroxyisobutyric acid and its derivatives.

Alpha-hydroxy isobutyric acid is prepared by oxidation of isobutylene dinitrogen tetroxide in nitric acid, or in a mixture of nitric acid and acetic acid, as solvent. In both cases, there is obtained a mixture of α-hydroxy isobutyric acid and its derivatives α-nitrato isobutyric acid and α-(α-hydroxy isobutyroxy) isobutyric acid. This mixture is obtained as solution in the solvent.

For conversion of said mixture to methacrylic acid, it has been necessary heretofore to convert said derivatives into the free α-hydroxy isobutyric acid, and to recover the same.

The assignee of this application has available two methods for the preparation of methacrylic acid and methacrylic acid esters from the respective α-hydroxy isobutyric acid compounds. According to one of said methods, the α-hydroxy isobutyric acid is converted to methacrylic acid by heating at 180–320° C. in the liquid phase in the presence of carboxylic acids which under the reaction conditions are practically not decarboxylated and have a boiling point above 180° C.

In the other method, the α-hydroxyisobutyric acid is dehydrated in the presence of basically reacting compounds at temperatures of at least 160° C.

It is a principal object of the invention to provide a process for converting the reaction mixture obtained by the oxidation of isobutylene with dinitrogen tetroxide which contains α-hydroxyisobutyric acid and its derivatives either in nitric acid as solvent or in a nitric acid-acetic acid mixture, directly to methacrylic acid.

Other objects and advantages will be apparent from a consideration of the specification and claims.

In accordance with the invention, the free nitric acid is removed from the reaction mixture, the residue dissolved in an acetic acid, is heated in a polar organic reaction medium having a boiling point over 160° C. and which is heated to a temperature of at least 160° C., preferably, 250 to 280° C., and the obtained methacrylic acid is continuously removed from the reaction medium.

In a suitable reaction medium, e.g., in a reaction medium consisting of naphthalic anhydride and phthalic acid methylester, the reaction temperature can be higher, e.g., 300–320° C.

The employed acetic acid has preferably a concentration of 95–100%.

If the starting mixture for the oxidation does not contain acetic acid, said acid may be added to the reaction mixture prior to the separation of the free nitric acid. However, it is also possible to add acetic acid to the residue after the removal of the nitric acid.

Critical conditions for the processing of the residue of the reaction mixture from the isobutylene oxidation are the presence of acetic acid and a polar reaction medium. It seems that a reaction medium of higher polarity has a stronger effect than the presence of a reaction medium of lower polarity.

As the polar reaction medium, such compounds are suitable which, in addition to C and H atoms, contain hetero atoms such as O, S, or N, and which have a boiling point over 160° C. preferably over 200° C.

Such compounds are, e.g., mono or polycarboxylic acids, such as stearic acid, naphthalic acid, phthalic acid, succinic acid, glutaric acid, maleic acid; functional derivatives of said acids such as the anhydrides, esters, and amides; polyethyleneoxide derivatives of ether compounds having the required boiling point, such as triethylene glycol dibutylether, tetraethylene glycol dimethyl ether; ether dicarboxylic acids, such as α,α-diisopropylether dicarboxylic acid; derivatives of the ether dicarboxylic acids, such as α,α'-diisopropylether dimethylester.

Said compounds of the reaction medium can be employed separately or as mixtures.

Advantageously, the reaction is carried out in the presence of catalysts. Suitable catalysts are compounds having alkaline reaction such as oxides, hydroxides, carbonates, carboxylates, acetates, and alcoholates of alkali metals and earth alkaline metals, also amines, phosphines, further alkali metal and earth alkaline metal compounds of neutral reaction, such as nitrates or sulfates. Preferably, sodium compounds are employed.

The concentration of the catalyst in the reaction medium depends on the rate of passage of the α-hydroxyisobutyric acid and its derivatives. Preferably, we use at a rate of passage of 1 mole/hour of α-hydroxyisobutyric acid and its derivatives 0.05 to 1.0 mole of catalyst.

In accordance with the invention we remove, preferably by distillation, the entire amount or at least the major part of the free nitric acid contained in the reaction mixture obtained by oxidation of isobutylene with dinitrogen tetroxide in a solvent which is nitric acid or a nitric acid-acetic acid mixture; residual traces of nitric acid do not interfere with the process of the invention.

The residue remaining after distillation of the nitric acid contains α-hydroxyisobutyric acid and its derivatives α-nitratoisobutyric acid and α-(α-hydroxyisobutyroxy) isobutyric acid will be present in solid, pulpy, or liquid form, depending on the solvent used in the oxidation of isobutylene (nitric acid or mixtures of nitric acid and acetic acid). When the oxidation of the isobutylene had been carried out, e.g., in a mixture of acetic acid and nitric acid, the nitric acid is removed in the distillation as an azeotropic mixture with the acetic acid; if the orignal solvent mixture had approximately said azeotropic composition (about 2 moles of acetic acid and 1 mole of nitric acid), the distillation residue will be obtained in solid form or as paste. Said residue is then dissolved in acetic acid, and the solution is subjected to the process herein described. The amount of acetic acid required depends on the solubility of the residue in acetic acid. Mostly, at least 10 percent by weight of acetic acid, calculated on the residue, will be necessary. The upper limit will be determined by economical considerations. An amount of 50–400% acetic acid is employed advantageously. If the solvent mixture used in the oxidation of the isobutylene contained an excess of acetic acid over the azeotropic composition, the distillation residue will be obtained as an acetic acid solution and can be directly processed as set forth herein.

Another possibility consists in forming a salt of the nitric acid with a basic compound which itself can serve, at the same time, as catalyst. A certain drawback of such method is that it requires relatively large amounts of compounds with alkaline reaction.

The formed methacrylic acid is continuously distilled out of the reaction medium together with acetic acid.

In order to assist the distillation of the methacrylic acid, a carrier agent, e.g., an inert gas, or a low boiling organic solvent may be additionally employed.

An addition of inhibitors such as induline, pyrocatechol, hydroquinone, hydroquinone monomethylether, methylene blue, and the like is recommended to prevent polymerization of the methacrylic acid.

Theoretically, the method of the invention can be carried out also as a batch process. Practically, such a process will not be commercially used for two reasons. In the first place, the yields in a batch process are about 30 to 40 percent lower than in the continuous process. Secondly, the batch process involves the risk of explosions because nitric acid is formed due to the presence of nitratoisobutyric acid. Also for this reason, the presence of basically reacting compound or the performance of the reaction in an alkaline to neutral medium is particularly important.

Other solvents than acetic acid cannot be employed in practice because such solvents like alcohol, acetic acid, higher carboxylic acids, and aromatic compounds are not stable in the presence of nitric acid. Acetic acid is stable in contact with nitric acid.

The following examples are given to illustrate the invention.

EXAMPLE 1

100 g. of a mixture consisting of 65 g. of glacial acetic acid and 35 g. of nitric acid (100%) were placed into a 250 ml. four-neck flask equipped with thermometer, reflux cooler, stirrer and gas inlet tube and 0.527 mole (48.5 g.) of $N_2O_4$ were introduced, with ice cooling, at a temperature of 0 to 5° C. Then, 0.189 mole (10.6 g.) of isobutylene were introduced. The rate of gas introduction was such as not to raise the temperature above 25° C. After absorption of the isobutylene, the mixture was heated for about 1 hour at 65° C., whereby the bulk of the nitrogen oxides escaped. As the oxidation reaction was exothermic, the temperature rose sometimes to almost 100° C., requiring intermediate cooling. After addition of 6.8 moles of water, the solution was again heated for 2 hours at 80° C. The solvent mixture was distilled off, and the yellowish clear reaction product was subjected to a vacuum distillation (1 mm. Hg) at which the bath temperature did not exceed 100° C. First, the azeotropic mixture of acetic acid and nitric acid distilled off between 28 and 44° C., and subsequently the pure acetic acid. The distillation residue was dissolved in glacial acetic acid in the ratio of about 1:3 and then pyrolyzed by slowly stirring the solution into a reaction bath heated at a temperature of 240–260° C. consisting of 60.0 g. of phthalic anhydride, 60.0 g. of dimethyl phthalate, 1.5 g. of NaOH, and 0.6 g. of pyrocatechol, whereby the forming methacrylic acid was distilled off at the same time in mixture with the acetic acid. By means of addition to bromine, methacrylic acid was determined in the distillate in a yield of 83.3 percent, calculated on isobutylene.

EXAMPLE 2

A distillation residue-glacial acetic acid mixture, obtained like in Example 1, was pyrolyzed at a temperature of 250–260° C. in a reaction bath consisting of 60.0 g. of glutaric acid anhydride, 40.0 g. of dimethyl phthalate, 1.5 g. of caustic soda as catalyst, and 0.6 g. of pyrocatechol, whereby the forming methacrylic acid was distilled off at the same time in mixture with the acetic acid. In the distillate, there was found a yield of 82.2 percent of methacrylic acid, calculated on isobutylene.

EXAMPLE 3

This example is given to illustrate the effect of water.

The oxidation of isobutylene with dinitrogen tetroxide was carried out as in Example 1. After addition of 70 g. of 96% acetic acid, the reaction mixture present after the oxidation was distilled in vacuo (1 mm. Hg) at a bath temperature of not more than 100° C., whereby the azeotropic mixture of acetic acid and nitric acid was drawn off. The distillation was discontinued after more than half of the solvent present at the beginning of the distillation had been distilled off. The distillation residue, consisting of α-hydroxyisobutyric acid and its derivatives dissolved in acetic acid, was pyrolyzed at 280° C. in a bath consisting of 60 g. of stearic acid, 2.0 g. of caustic soda, and 0.3 g. each of hydroquinone and induline as inhibitors. There resulted a yield of methacrylic acid of 62 percent, calculated on isobutylene.

EXAMPLE 4

Three oxidations according to Example 1 were carried out one, after the other, each with 0.189 mole of isobutylene. The distillation residues obtained in the individual oxidations and each dissolved, after the vacuum distillation, in 65 g. of glacial acetic acid, were pyrolyzed sequentially at 260° C. in the same reaction bath consisting of 90 g. of tetraethyleneglycol dimethylether, 6.6 g. of anhydrous sodium acetate as catalyst, and 1.0 g. of pyrocatechol as polymerization inhibitor, whereby the forming methacrylic acid was distilled off at the same time in mixture with the acetic acid. The methacrylic acid was determined in the distillate by the bromine number.

The yield, calculated on isobutylene, was 85%. The next run yielded 88.2%.

The reaction bath could be used again many times without losing its efficiency.

We claim:

1. A method for the continuous preparation of methacrylic acid from the reaction mixture obtained by the oxidation of isobutylene with dinitrogen tetroxide in the presence of nitric acid comprising removing free nitric acid from said reaction mixture, heating the residue dissolved in acetic acid in a polar organic reaction medium having a boiling point above 160° C. selected from the group consisting of stearic acid, naphthalic acid, phthalic acid, succinic acid, glutaric acd, maleic acid, anhydrides of said acids, esters of said acids, amides of said acids, polyethyleneoxide derivatives of ethers, dicarboxylic acid ethers, esters of dicarboxylic acid ethers and mixtures thereof, which is heated to a temperature of at least 160° C. and removing continuously methacrylic acid from the reaction medium.

2. The method as claimed in claim 1 wherein said reaction mixture contains acetic acid from the oxidation reaction.

3. The method as claimed in claim 1 comprising adding acetic acid to said residue before it is introduced into the reaction medium.

4. The method as claimed in claim 1 wherein said heating temperature is 250 to 280° C.

5. The method as claimed in claim 1 wherein the reaction is carried out in the presence of a polymerization inhibitor.

6. The method as claimed in claim 1 wherein the free nitric acid is removed by distillation.

7. The method as claimed in claim 1 wherein the reaction is carried out in the presence of a catalyst selected from the group consisting of alkali metal oxides, hydroxides, carbonates, carboxylates, acetates, alcoholates, nitrates, sulphates; alkaline earth oxides, hydroxides, carbonates, carboxylates, acetates, alcoholates, nitrates, sulphates; alkaline reacting amines and phosphines.

References Cited

UNITED STATES PATENTS

| | | | |
|---|---|---|---|
| 2,971,981 | 2/1961 | Aries | 260—533 |
| 2,811,545 | 10/1957 | Steadman | 260—531 |
| 2,811,546 | 10/1957 | Robertson | 260—531 |

LORRAINE A. WEINBERGER, Primary Examiner

D. E. STENZEL, Assistant Examiner

U.S. Cl. X.R.

260—531